(12) United States Patent
Volk et al.

(10) Patent No.: US 9,015,206 B2
(45) Date of Patent: Apr. 21, 2015

(54) METHOD AND APPARATUS FOR ORGANIZING AND PLAYING DATA

(75) Inventors: Andrew R. Volk, San Francisco, CA (US); Ronald Jacoby, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/619,188

(22) Filed: Sep. 14, 2012

(65) Prior Publication Data

US 2013/0080906 A1    Mar. 28, 2013

Related U.S. Application Data

(63) Continuation of application No. 12/401,340, filed on Mar. 10, 2009, now Pat. No. 8,606,828, which is a continuation of application No. 10/459,341, filed on Jun. 11, 2003, now Pat. No. 7,512,622.

(51) Int. Cl.
*G06F 17/30* (2006.01)
*G06F 3/0484* (2013.01)

(52) U.S. Cl.
CPC ........ *G06F 3/0484* (2013.01); *G06F 17/30038* (2013.01); *G06F 17/30058* (2013.01); *Y10S 707/99943* (2013.01); *Y10S 707/99945* (2013.01)

(58) Field of Classification Search
CPC .............. G06F 17/30286; G06F 17/30295
USPC ........... 707/705, 763, 805, 912, 913, 914, 707/999.102, 999.107, 5, 662, 663, 707, 707/709, 771, 803; 715/205, 234, 738, 200, 715/201, 243, 246, 716, 719, 723, 730, 748
See application file for complete search history.

(56) References Cited

U.S. PATENT DOCUMENTS

| | | | |
|---|---|---|---|
| 6,311,194 B1 * | 10/2001 | Sheth et al. | 715/236 |
| 6,732,331 B1 * | 5/2004 | Alexander | 715/234 |
| 2002/0026638 A1 * | 2/2002 | Eldering et al. | 725/42 |
| 2002/0049788 A1 * | 4/2002 | Lipkin et al. | 707/513 |
| 2002/0178447 A1 * | 11/2002 | Plotnick et al. | 725/36 |
| 2009/0112933 A1 * | 4/2009 | Kato et al. | 707/104.1 |

* cited by examiner

*Primary Examiner* — Greta Robinson
(74) *Attorney, Agent, or Firm* — James J. DeCarlo; Greenberg Traurig, LLP

(57) ABSTRACT

The present invention provides a general solution to presenting media interface and navigation tools for content provided from a plurality of sources. The invention maintains a user at a single site regardless of the source of the media content. This permits a consistent interface to be presented to the user. Because the user remains at the same site, differences in tiered membership may be tracked so that the user is only presented with content that the user is permitted to view. The invention uses a metadata language to characterize content so that viewer type, membership level, and other information can be maintained and used for an enjoyable viewing experience.

33 Claims, 15 Drawing Sheets

METHOD AND APPARATUS FOR ORGANIZING AND PLAYING DATA

CROSS REFERENCE TO RELATED APPLICATIONS

This application is a continuation of, and claims priority from, U.S. patent application Ser. No. 12/401,340, filed Mar. 10, 2009, entitled METHOD AND APPARATUS FOR ORGANIZING AND PLAYING DATA, now U.S. Pat. No. 8,606,828 on Dec. 10, 2013, which is a continuation of U.S. patent application Ser. No. 10/459,341, filed Jun. 11, 2003, entitled METHOD AND APPARATUS FOR ORGANIZING AND PLAYING DATA, now U.S. Pat. No. 7,512,622 on Mar. 31, 2009.

BACKGROUND OF THE INVENTION

1. Field of the Invention

The present invention relates to the field of organizing and playing data.

Portions of the disclosure of this patent document contain material that are subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

The personal computer has become a resource for entertainment as well as traditional data processing functionality. In many cases, the personal computer has replaced home stereo systems as a source of audio entertainment. Many users have replaced hard copies of books and magazines with e-copies of reading materials for review via a computer. Another popular use for personal computers is the presentation of medial information and entertainment.

Often, the providing of media entertainment, such as audio or video entertainment, occurs via a network, such as the interne. Certain web sites are known for the availability of video clips of movies and television programs, or audio program files, that a computer user can view, listen to, and possibly purchase. In some cases, television or radio networks provide web sites devoted to their own shows or to a single show. Many times a web site is designed to provide an "enhanced" experience in real time during the broadcast of a television program. Such enhanced features may include comprehensive statistics in the case of sporting events, commercial tie-in and purchase opportunities in the case of entertainment programs, play-along quizzes, or even competition during game shows.

In some cases, additional media content is made available to internet users between broadcasts of programs to promote interest, loyalty, and viewing opportunities, when a program is not otherwise airing. There are a number of disadvantages with many of the current systems for obtaining such content via the internet as will be described below.

A number of web sites purport to provide a central location where a variety of media can be obtained and experienced by a user on a personal computer via a network. A disadvantage with many of these sites is a failure to provide a consistent interface for content from different sources. Another disadvantage is the failure to provide to the user only content that is actually playable by the user. Often the user is prompted to mistakenly buy player capability that the user doesn't want or need.

Certain web sites purport to provide a portal or central location for accessing media data and content from a variety of sources, including from different networks and internet media sources. A problem for a user on such a site is the inconsistency of the presented interface for different content. In a typical situation, a user may elect to view a content clip from a program from one of the broadcast networks. When the clip is selected, the user may actually be transferred to the network's own web site for viewing of the clip.

When the user is transferred, the entire interface for viewing clips is often changed to the interface supported by the source site. This diminishes the viewing experience for the user and requires the user to pay extra attention to where navigation and activation controls are located in order to effectively use the site for viewing of content.

Another problem occurs when a user is part of a tiered membership or subscription service on a portal site. Lower tiers of membership may have restrictions on which content is available. When the portal switches the user to the content source site, the user may be presented with all possible content, even though the user is able to view only a subset of the listed content. This diminishes the user's experience because the user is made aware of a limited experience.

Finally, the user may be referred to data that is not playable on the user's currently installed content player. The user may be presented with a list of available content that does not indicate which player is used or required to play the content. When a user selects a clip or content that requires a player that the user does not currently have, the user may be directed to a site where a new player can be obtained. Often these sites are confusing. A free player is often available but the user is urged to purchase a "professional" or "full featured" version of a player not really needed for the clip which the user wants to play. Often the user mistakenly purchases the "for purchase" player instead of simply accepting the free player.

SUMMARY OF THE INVENTION

The present invention provides a general solution to presenting media interface and navigation tools for content provided from a plurality of sources. The invention maintains a user at a single site regardless of the source of the media content. This permits a consistent interface to be presented to the user. Because the user remains at the same site, differences in tiered membership may be tracked so that the user is only presented with content that the user is permitted to play. The invention uses a metadata language to characterize content so that player type, membership level, and other information can be maintained and used for an enjoyable experience.

DETAILED DESCRIPTION

A method and apparatus for presenting and playing content on a network is described. In the following description, numerous details are set forth in order to provide a more thorough description of the present invention. It will be apparent, however, to one skilled in the art, that the present invention may be practiced without these specific details. In other instances, well known features have not been described in detail so as not to unnecessarily obscure the present invention.

Figure 1:
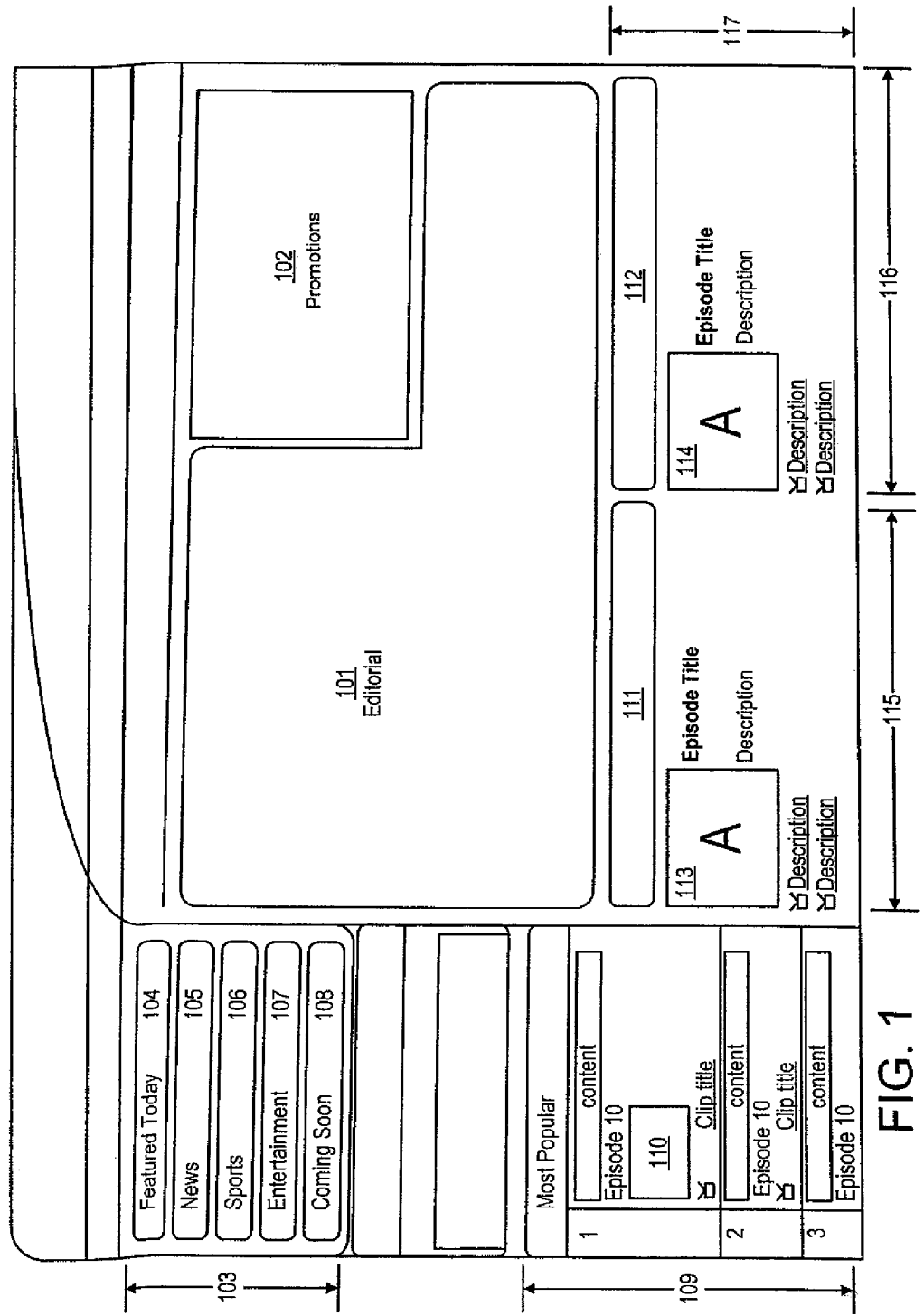
FIG. 1 illustrates a website of one embodiment of the present invention in an initial state.

The present invention provides a consistent interface and user navigation system for media clips from all sources. In the following description, an example of organizing and playing viewable content, such as video content, is described. It is understood that the invention has equal application to audio media content as well. FIG. 1 illustrates one embodiment of the interface of the present invention. The invention contemplates a drill down approach to certain aspects of navigation with FIG. 1 illustrating the top or home level of navigation. In certain embodiments, the upper region of the home level can include a title or masthead, a date, a greeting and user links and tools. For example, the title can be "Yahoo! Platinum", and the user links and tools may include a "Platinum Home" link, a "Yahoo!" link, a "Help" link, a text field for inputting help queries, a "Sign Out" link, an "Account Information" link and an "Options" link. The display includes two display areas 101 and 102. Area 101 is referred to as an "editorial" area and can include show titles and logos, navigation tools, and other information. Region 102 is an area reserved for promotions and can include still or Flash type promotions or advertisements.

An area 103 includes links to a number of categories or "channels" that the user can select to be presented with viewing choices falling within a particular genre or type. FIG. 1 illustrates a number of channels by way of example, including "Featured Today" 104, News 105, Sports 106, Entertainment 107, and Coming Soon 108. By selecting one of these categories, the user is able to access another interface that provides choices related to the genre. Featured Today 104 is a channel that is suitable for breaking news or even for sponsored clips that may relate to a current film or to a broadcast event of the same or impending day. The selections may represent pre-recorded media or live broadcast media. In certain embodiments, below region 103, the home level can include information related to the current user's subscriptions. One example of a title for this region is "My Subscriptions". This region displays the subscriptions the user is currently signed up for and may, in certain embodiments, include promotional information. For example, one promotional advertisement may state, "For only $8.99 you could upgrade to Platinum Premium!"

The provision of choices of selected shows, news, and sports is indicated in region 117. The show title, logo, or brand is indicated in regions 111 and 112. Below each logo bar is an information region 115 and 116, respectively, that provides program information to the user. This information includes the episode title and a brief description of the episode. It also includes a thumbnail image of the available show or clip in region 113 and 114.

A region 109 is also provided to the user that lists available content. The content may be sorted in a number of ways. In the example of FIG. 1, the content is listed as Most Popular, which may be based on any of a number of time periods, including by the day, the week, or even the hour. Also in the example of FIG. 1, the most popular clip listed may include a thumbnail 110 to provide additional information to the user of the available clip. The Most Popular listing may be with respect to all content, by channel, by category, or by any other suitable or desired population of media clips. It should be appreciated that in different embodiments of the present invention, the pixel size of the display can vary between different images. For instance, in the example illustrated in FIG. 1, the promotion in area 102 has a pixel size of 300×250 dots per inch (dpi) while the thumbnail 110 has a size of 88×66 dpi.

Figure 2:
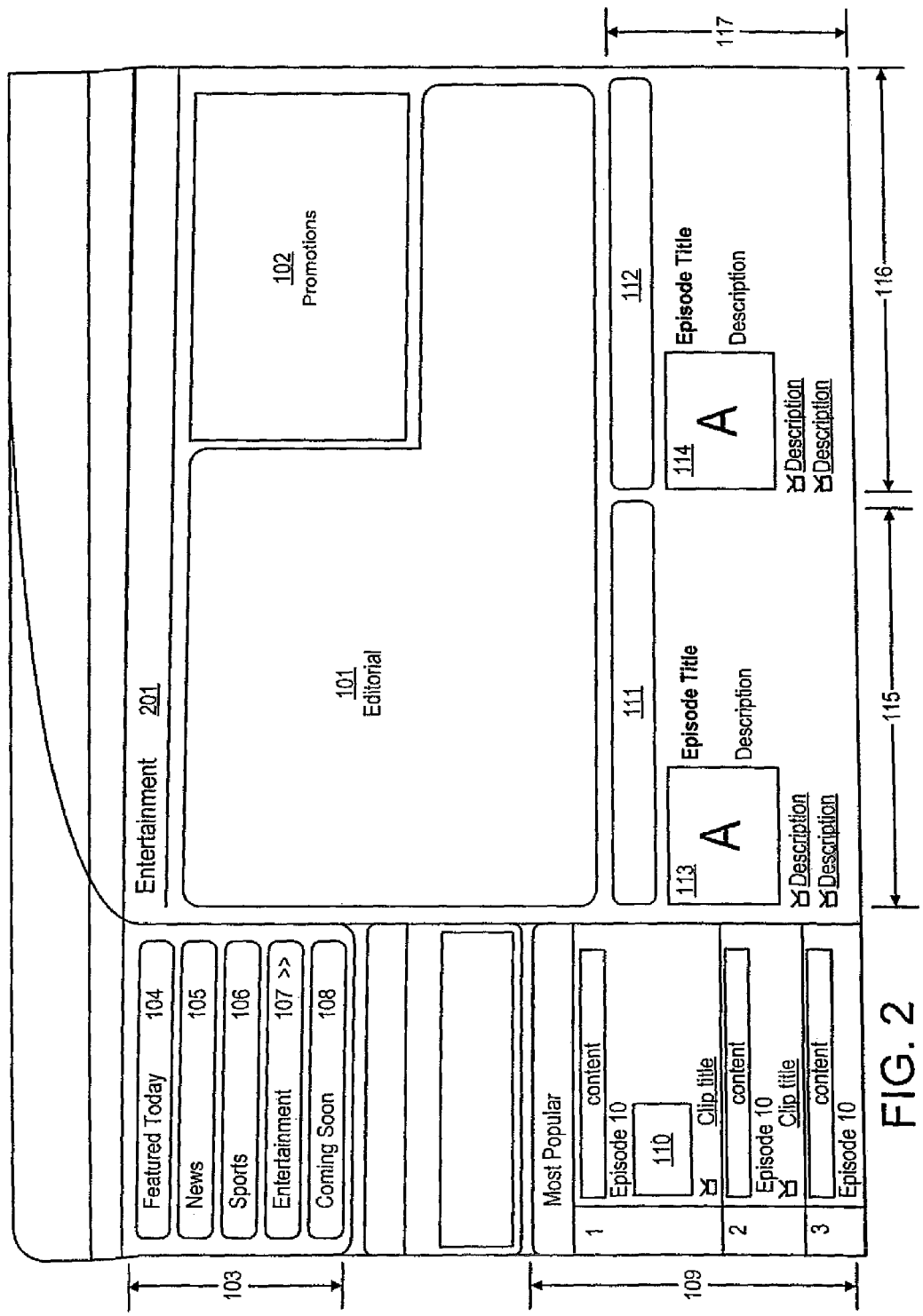
FIG. 2 illustrates a web site of one embodiment of the present invention after a user menu selection.

FIG. 2 illustrates the interface of the invention after the user has selected a channel. In the example shown, the user has selected the Entertainment 107 channel. This selection presents a slightly changed interface to the user with a channel indicator 201 displayed at the top of the editorial section 101. In addition, region 117 now only presents show selections which correspond to the user's selection.

Figure 3:
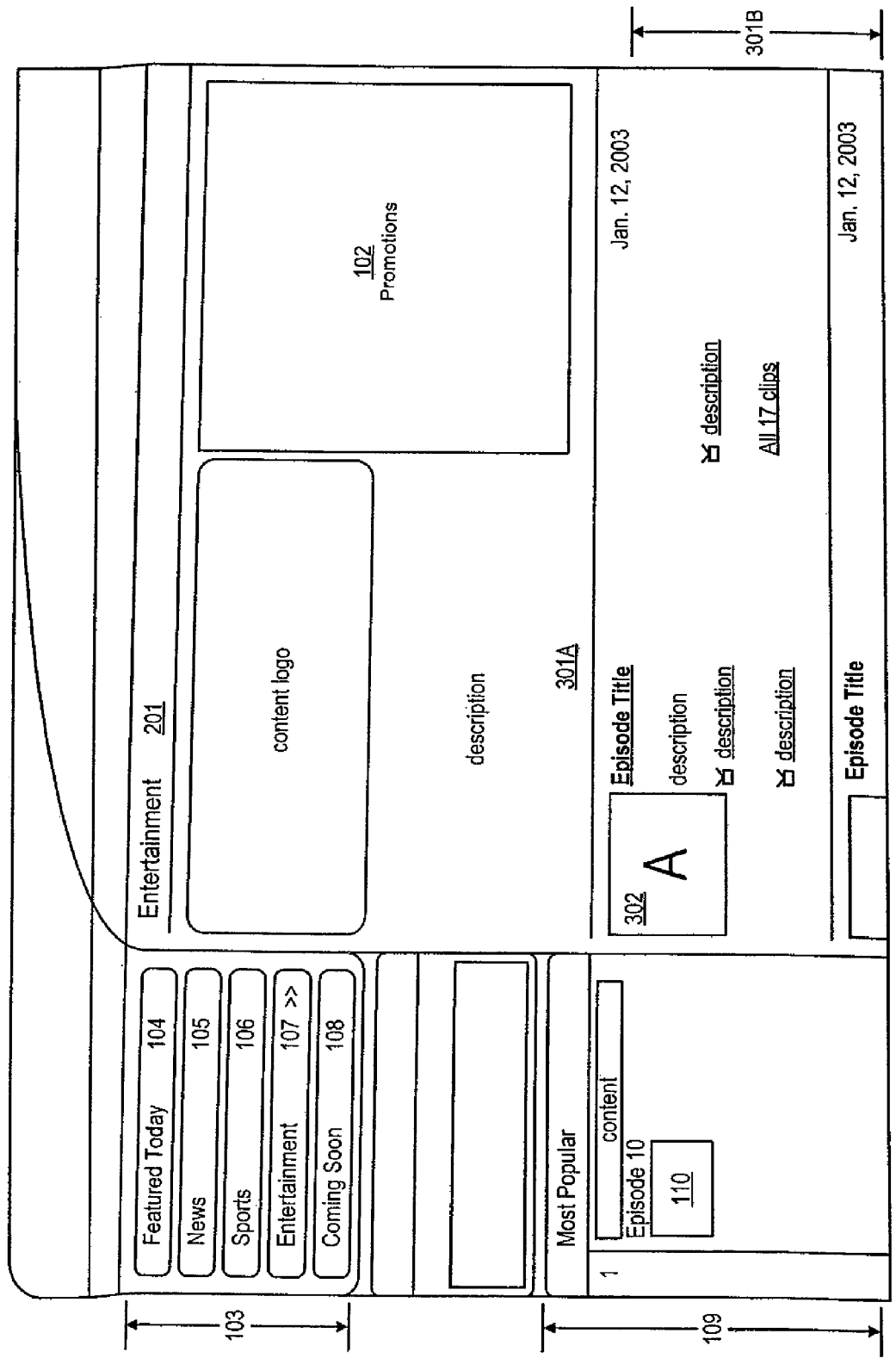
FIG. 3 illustrates a web site of one embodiment of the present invention after a show has been selected.

FIG. 3 illustrates the display of an embodiment of the invention when a user has selected a particular show. When a show is selected, the Editorial area 101 is divided into two areas 301A and 301B. Area 301A displays a title, logo, or other indicator of the show selected and a text description of the show. Area 301B displays a thumbnail 302 of the episodes that are available for the show that is selected for viewing, along with text having a short written description of the selected episode. In one embodiment of the invention, a number of other clips available for viewing are displayed below area 301B and use a similar geography to display data, including a thumbnail image and text description. The channel selections 104-108 remain visible and available in region 103, as does the Most Popular list in region 208.

Figure 4:
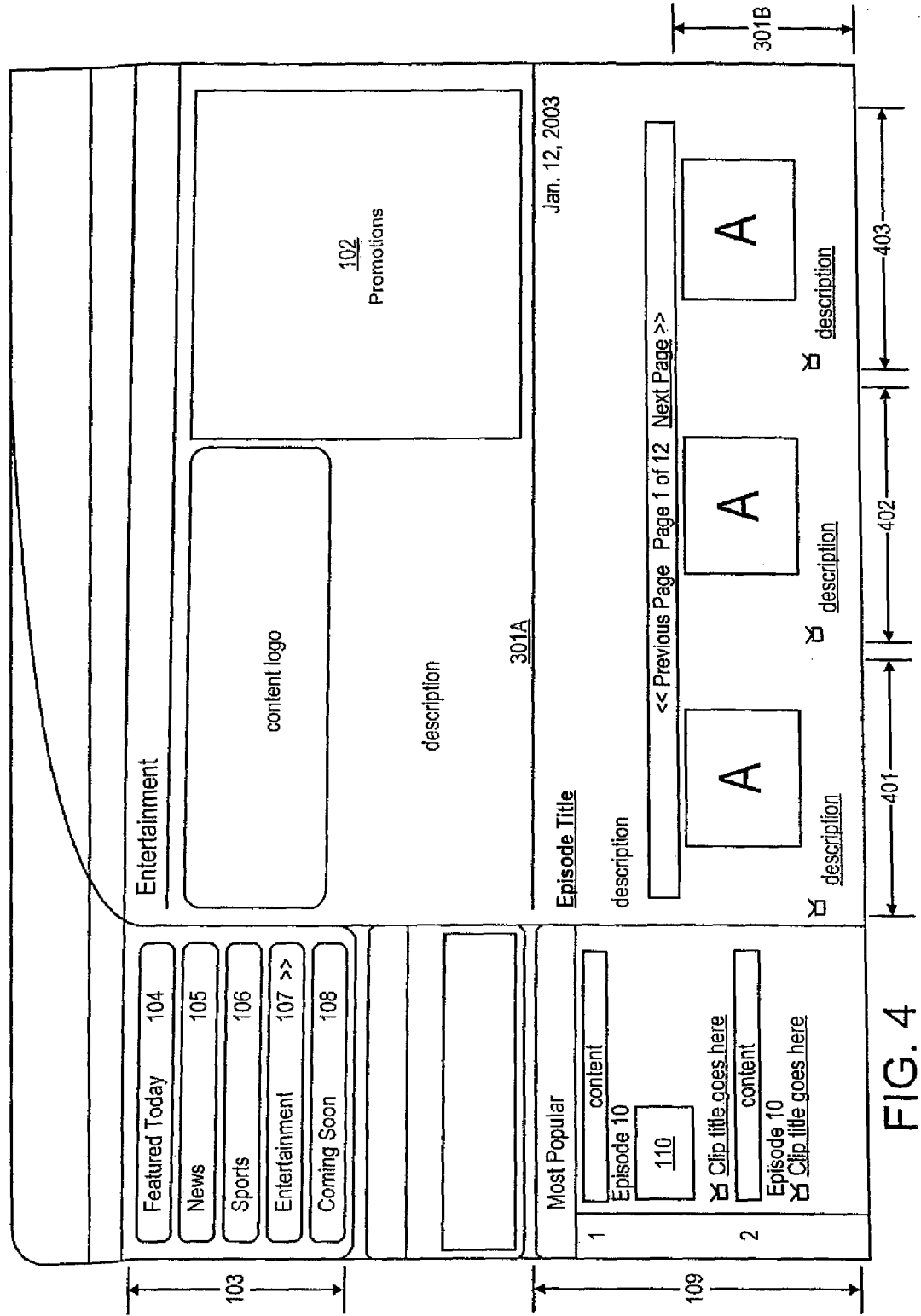
FIG. 4 illustrates a web site of one embodiment of the present invention after an episode has been selected.

FIG. 4 illustrates the display in an embodiment when the user selects an episode of a show. When this is selected the editorial section 301B displays a plurality of chapter or clip selections of the selected episode such as selections 401, 402, and 403. The user can select one of the chapter selections for viewing in region 102 of this embodiment of the invention.

A desired feature of one embodiment of the present invention is that a user is only presented with data that the user can actually view at the subscription level of which the user is a member. This distinguishes the invention from prior art schemes where the user may be presented with data that is not viewable based on the subscription level or even based on the player or connection speed of the user. One of the embodiments of the invention that makes this possible is that the data resides in a database on the web site of the invention. Unlike prior art schemes that link to external data sources, the present invention maintains data locally.

The present invention is able to customize content presentation because of the data structure of the database used for the local data storage. In one embodiment, data is stored using an XML template unique to the present invention. This allows metadata to be included which facilitates the sorting and presentation of data to the user, making a consistent interface and experience possible. In one embodiment, XML data is stored locally but some or all content is stored remotely and linked to a local site.

The template below is an example of one embodiment of an XML datastore template used in the present invention. The template is for a "FEEDITEM" which is associated with a clip for viewing. XML documents may have multiple FEEDITEMS. It should be noted that items are not required to have all elements listed.

```
<CMSFEED>
    <CONTACT EMAIL="" TELEPHONE=""></CONTACT>
    <FEEDITEM TYPE="" MEDIA="" ID="" SORTORDER="">
    <TITLE><TITLE>
    <DESCRIPTION></DESCRIPTION>
    <DURATION></DURATION>
    <VALIDTIME TZ=""></VALIDTIME>
    <EXPIRATIONTIME TZ=""><EXPIRATIONTIME>
    <BLACKOUT REGION=""></BLACKOUT>
    <STREAM BITRATE="" FORMAT=""></STREAM>
    <AIRTIME TZ=""><AIRTIME>
    <IMAGE USE=""></IMAGE>
    <FEEDITEM>
</CMSFEED>
```

XML Element Description

The XML elements described here are by way of example only. Additional or fewer elements may be included without departing from the spirit and scope of the present invention.

CMSFEED is the container for XML content feeds to the present invention and contains a number of other XML elements.

CONTACT Xml Specs

The CONTACT element contains the name of the contact at the content publisher who is responsible for the content feed. (example: "Joe Smith")

EMAIL: Email address of the person who is publishing this show. (example: "joesmith@yaboo-inc.com").

TELEPHONE: Telephone number of the person who is publishing this show. (example: "800-555-1212").

FEEDITEM Xml Specs

The FEEDITEM element holds the data for either a category or a clip.

TYPE: This is the type of node being described. For the allowed values, "category" is a container for clips. Depending on the time of media being played in the invention, this could be equivalent to an episode of a TV show, or it could be used to represent another type of clips container.

MEDIA: The type of media being described. This is only used for clips. "Video" refers to a video file. Audio" refers to an audio-only file.

ID: Pathname of the show. (example: "/episode1" or "/episode3/clip1"). Maximum length for this field is 50 characters. Valid values for this field: In one embodiment the ID only consists of letters and numbers [i.e., A-Z|a-z|0-9] and no symbols [i.e., no #, @, etc.] are allowed in the ID.

SORT ORDER: Valid values for this field include any number from 100 to 10000. In one embodiment of a list of clips or categories, the item with the highest number is displayed first, then the item with the second highest number is displayed next, and so on. The difference in SORTORDER between each item is in multiples of 10 in this embodiment. It is understood that the sorting can be in reverse order as well and any suitable difference between items may be employed.

TITLE Xml Specs

This element is for the title of the piece of media. Referring briefly to FIG. 2, the title data is displayed in location 201 when it is category information and at location 320 in FIG. 3 when it is a show or clip title. In one embodiment, the maximum length of this field depends on the TYPE of FEEDITEM being described:

For a "category" piece of media, the title length can be, e.g., up to 25 characters.

For a "clip" piece of media, the title length can be, e.g., up to 50 characters.

DESCRIPTION Xml Specs

This element is a description of the clip. It is displayed in the metadata pane and on the web site, such as at location 301A in FIG. 3. The length of this field depends on the TYPE of FEEDITEM being described.

For a "category" piece of media, the length can be, e.g., up to 75 characters.

For a "clip" piece of media, this field can be, e.g., up to 260 characters.

DURATION Xml Specs

This is the length of the clip. format: hh:mm:ss.

VALIDTIME Xml Specs

This is the date and time that the content will start being displayed on the invention site and will become available to subscribers. In some embodiments, this field is not required. Format: mm/dd/yyyy hh:mm AM/PM TZ: time zone of publish start and end times. Valid values:

"CST"|"CDT"|"EST"|"EDT"|"MST"|"MDT"| "PST"|"PDT"

EXPIRATIONTIME Xml Specs

This is the date and time that the content will be automatically removed from the invention site, and will no longer be available to subscribers. This field is not required in all embodiments. Format: mm/dd/yyyy hh:mm AM/PM.

TZ: time zone of publish start and end times. Valid values:

"CST"|"CDT"|"EST"|"EDT"|"MST"|"MDT"| "PST"|"PDT"

BLACKOUT Xml Specs

This makes it possible to "black out" a piece of content from users whose account information indicates they are in a specific DMA (Designated Market Area). This could, for example, be used for sporting events which cannot be rebroadcast in specific areas. Valid values for this field depend on the REGION setting: For DMA, an example of a valid value is "SAN FRANCISCO-OAK-SAN JOSE," for ZIP (Zip code), an example of a valid value is "94089." This element is optional.

REGION: Sets system for selecting geographic areas to blackout. Valid values: "DMA"|"ZIP".

STREAM Xml Specs

The invention can have multiple STREAM elements. However, for each FEEDITEM, the streams represented by these elements must have the same content. The only difference is the speed and media type. In one embodiment, a default value is such that each FEEDITEM clip has 6 streams (56 k windows media, 100 k windows media, 300 k windows media, 56 k real, 100 k real, 300 k real).

FORMAT: Stream format. Valid values="wm"|"asf"|"wmv"|"wma"|"rnv"|"rm"| "rna"|"ra"

"wm" or "asf"=windows media file
"wmv"=windows media video file
"wma"=windows media audio-only file
"rnv" or "rm"=real networks video file
"rna" or "ra"=real networks audio-only file BITRATE: Stream Speed. Valid values="56"|"100"|"300"

AIRTIME Xml Specs

This element is the date and time that the clip was originally broadcast (if it was in fact broadcast). Format: mm/dd/yyyy hh:mm AM/PM TZ: time zone of publish start and end times. Valid values:
"CST"|"CDT"|"EST"|"EDT"|"MST"|"MDT"|"PST"|"PDT"

IMAGE Xml Specs

This element is an image for a FEEDITEM. The size for this image is, for example, 120×90, and is in a format such as GIF, JPEG, or any other suitable format in one embodiment. The IMAGE can be displayed in regions 206, 207, 302, 401, 402, or 403, for example.

USE: This describes how the content should be used. Each piece of media may, for example, have a "largethumb" and "smallthumb" associated with it—these images should be images from the piece of media. Valid values: "SMALLTHUMB"|"LARGETHUMB"

SMALLTHUMB: The size for this image may be, e.g., 88×66, and it may be in JPEG, GIF, or any other suitable format.

LARGETHUMB: The size for this image may be 120×90, and it may be in JPEG, GIF, or any other suitable format.

Content Provider Accounts

A content provider that desires to interact with the site of the present invention has an assigned Content Management System (CMS) account with provider names and passwords. The providers can FTP (file transfer protocol) media files, images and XML feed documents using the template described above. The transferred media files, with the associated metadata according to the XML template, are then provided to a page generation tool and assembled into a window and accompanying channel modules. This process can be automated so that content can be published (assuming its availability date is current) almost instantly.

The database is accessible by content providers and partners via password, allowing remote editing and updating of the content. For example, a clip can easily be removed from the site by changing the expiration time entry to a date that has already passed. Data content may also inherit metadata attributes from its category and from its associated show. For example, an external site link may be inherited by a clip (such as to an official site for a show). In addition, copyright information may be inherited at a show or category level as well. Clips are associated with a show and shows are associated with a category.

Figure 5:
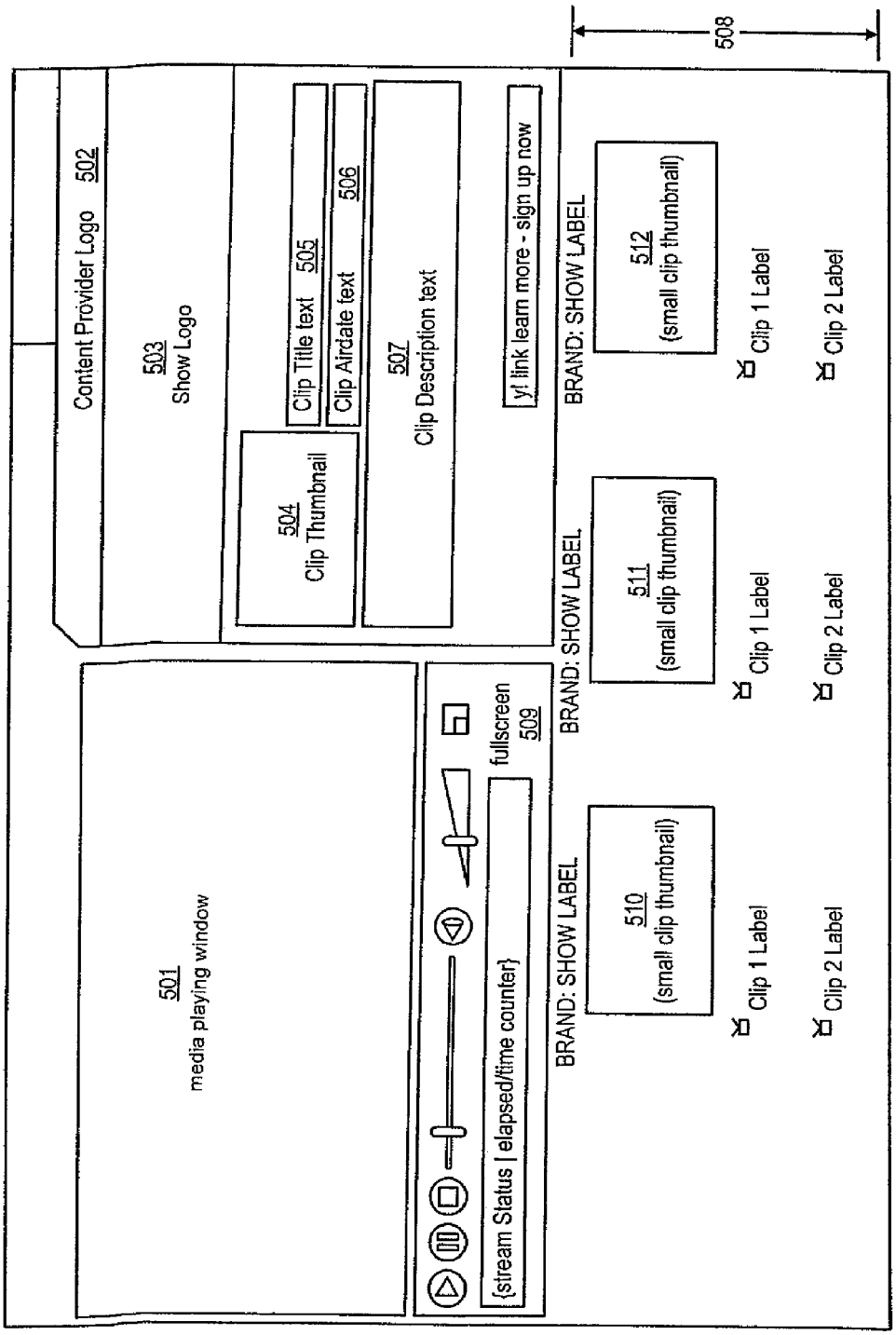
FIG. 5 illustrates a player of one embodiment of the present invention in an initial state.

FIG. 5 illustrates an alternate embodiment of the present invention showing an interface on a media player. In certain embodiments, the upper region of the media player can include a title or masthead and user links. For example, the title can be "Yahoo! Platinum", and the user links may include a "Platinum Home" link and a "Help" link. A media playing window 501 is provided at an upper-left location of the player geography. The viewing window 501 includes a control bar 509 just below the viewing window with player controls, such as play, pause, stop, progress bar, volume, etc. XML metadata associated with content can be mapped to areas of the player geography. In certain embodiments, the viewing window has a display ratio of 4:3, and may display, for example, a Yahoo! platinum logo bumper loop while new content buffers and a y!p audio logo slide/loop for audio-only media. Region 502 is an informational area reserved for a logo of the content provider. This could be a network, a show, a series, etc. Region 503 is another informational area reserved for a show logo graphic. Region 504 is reserved for a thumbnail of an available or selected clip. Regions 505 and 506 display the clip title metadata and airdate metadata, respectively. The metadata description text of the clip is displayed in region 507. Region 508 is reserved for additional available clips and displays thumbnails in regions 510, 511, and 512, for example, along with associated title and/or description metadata. In certain embodiments, the thumbnails displayed in regions 510, 511, and 512 have a display ratio of 4:3. Additional text and hyperlinks can also be displayed in area 508. For example, advertising information allowing the user to link to additional material that is being offered. One example of advertising information may be, "you are enjoying a free preview of Yahoo! platinum . . . sign up now!" It should be appreciated that in different embodiments of the invention, the pixel size of the media player and the regions included in the media player can vary. For instance, in the example illustrated in FIG. 5, the media player has a pixel size of 794×543 dpi, the masthead region has a pixel height of 35 dpi, the viewing window of media playing window 501 has a pixel size of 400×300 dpi, the control bar 509 has a pixel size of 400×43 dpi, the region 508 has a pixel size of 543×156, the thumbnails 510, 511, and 512 have a pixel size of 88×66 dpi. The pixel sizes of this embodiment were designed for Windows Internet Explorer version 5+. Other Platforms may require adjustments in the pixel sizes.

Figure 6:
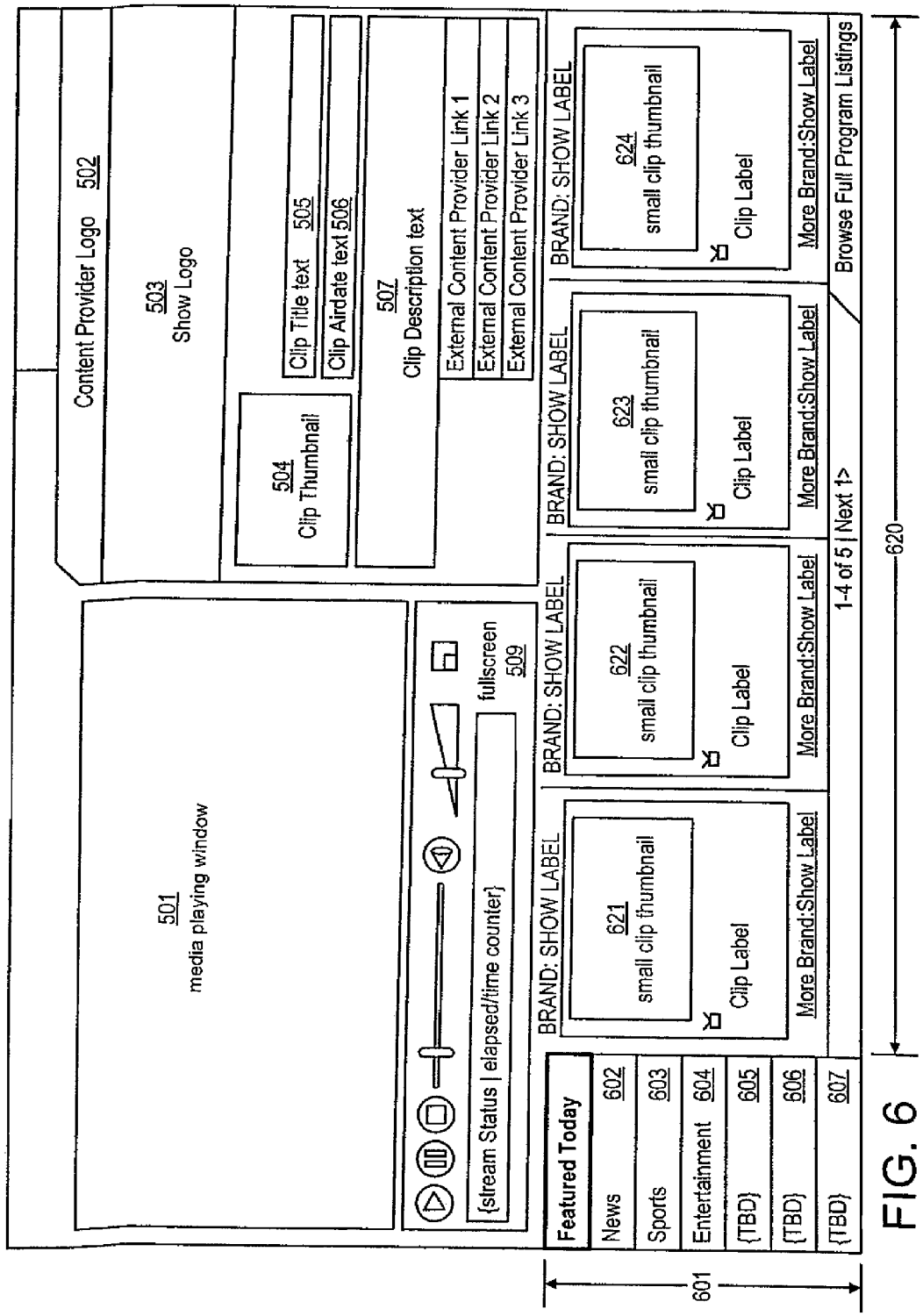
FIG. 6 illustrates a player of one embodiment of the present invention after a user menu selection.

FIG. 6 illustrates the interface of the player after a user has signed in. The bottom portion of the display geography is now changed to add channel selections 602-607 to region 601. In certain embodiments of the invention, the region 601 has a pixel size of 94×156 dpi. In addition, Region 620 includes content modules that now displays a number of thumbnails of available clips such as thumbnails 621-624. In certain embodiments of the invention, the region 620 has a pixel size of 697×156 dpi and the thumbnails 621-624 have a pixel size of 88×66 dpi. This region can be scrolled horizontally in one embodiment to permit the display of additional thumbnails of available clips. In the embodiment of FIG. 6, by clicking the "Brand: Show Label" the media player jumps to the show corresponding to the content module clicked. Clicking the bookmark icon adds the corresponding show to "My Shows" and displays a confirmation dialog. Clicking the thumbnail or "Clip label" jumps the media player to the corresponding show and the media player begins to play the specified clip.

Figure 7:
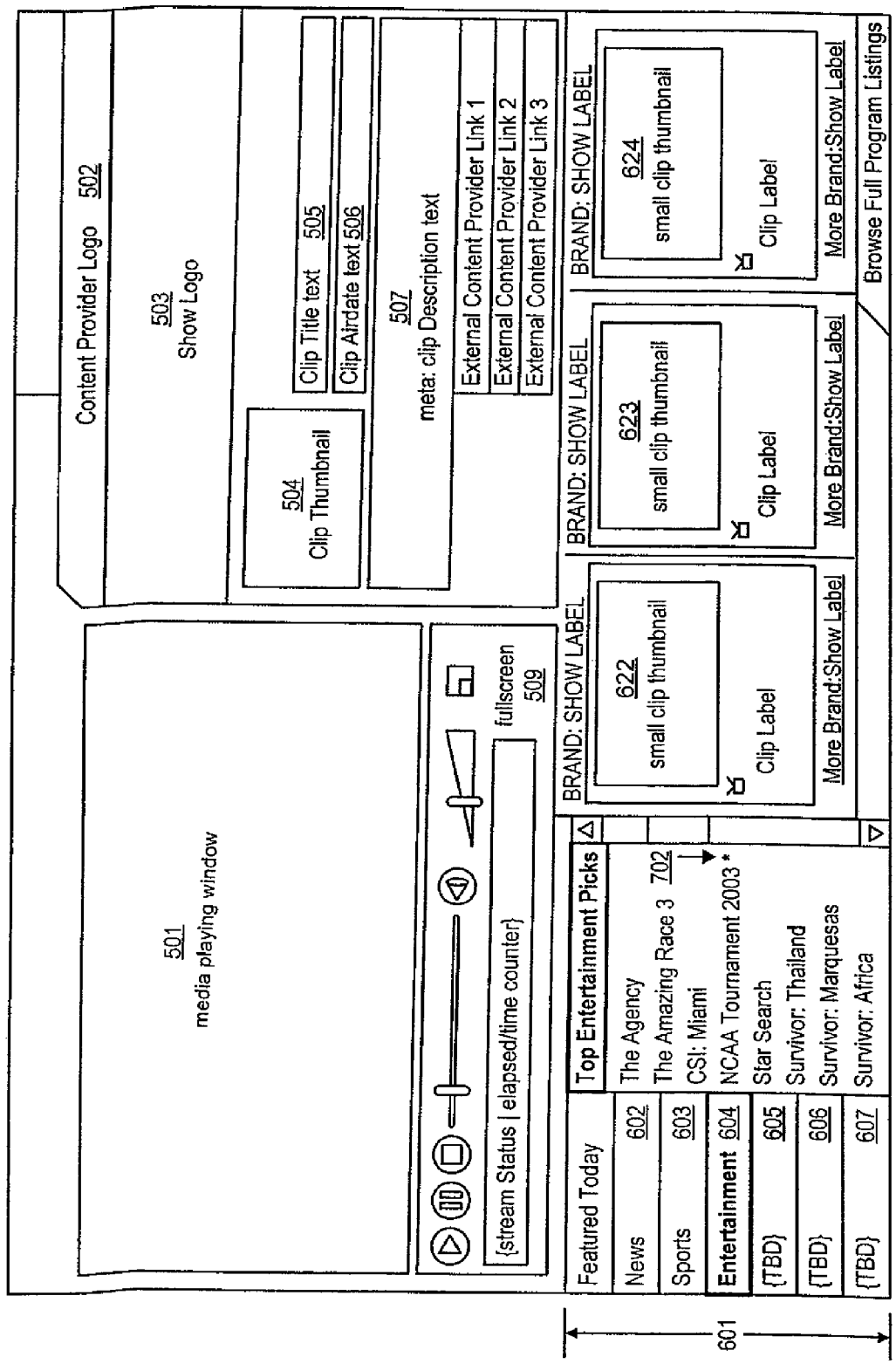
FIG. 7 illustrates a player of one embodiment of the present invention after a show has been selected.

FIG. 7 illustrates the interface of the player when one of the channels in region 601 is selected. In this example, Entertainment Channel 604 has been selected. This causes a pull-down menu 701 to be displayed in the region adjacent to region 601 and displays available content for the selected channel. In certain embodiments of the invention, the region 701 has a pixel size of 169×156 dpi. The example illustrates one of the advantages of the present invention. One of the selections, namely the NCAA Tournament 2003, includes a following star symbol 702. This indicates premium content and the user knows that this content is not available unless the user has a premium account. This is possible because of the local storage of content by the invention and the use of the XML metadata to store access levels which are required for certain content. In another embodiment, only available permitted content at the user level is shown, with premium or other unavailable content filtered out. This makes the viewing experience more desirable using the present invention. In one embodiment, the indication is not marked. When a user attempts to play content for which the user does not have access, the user may be redirected to a presentation that offers the ability to subscribe to the service.

The player may be a third-party player which is "skinned" to provide the desired consistent interface. In other embodiments, the player is a purpose built player.

Figure 8:
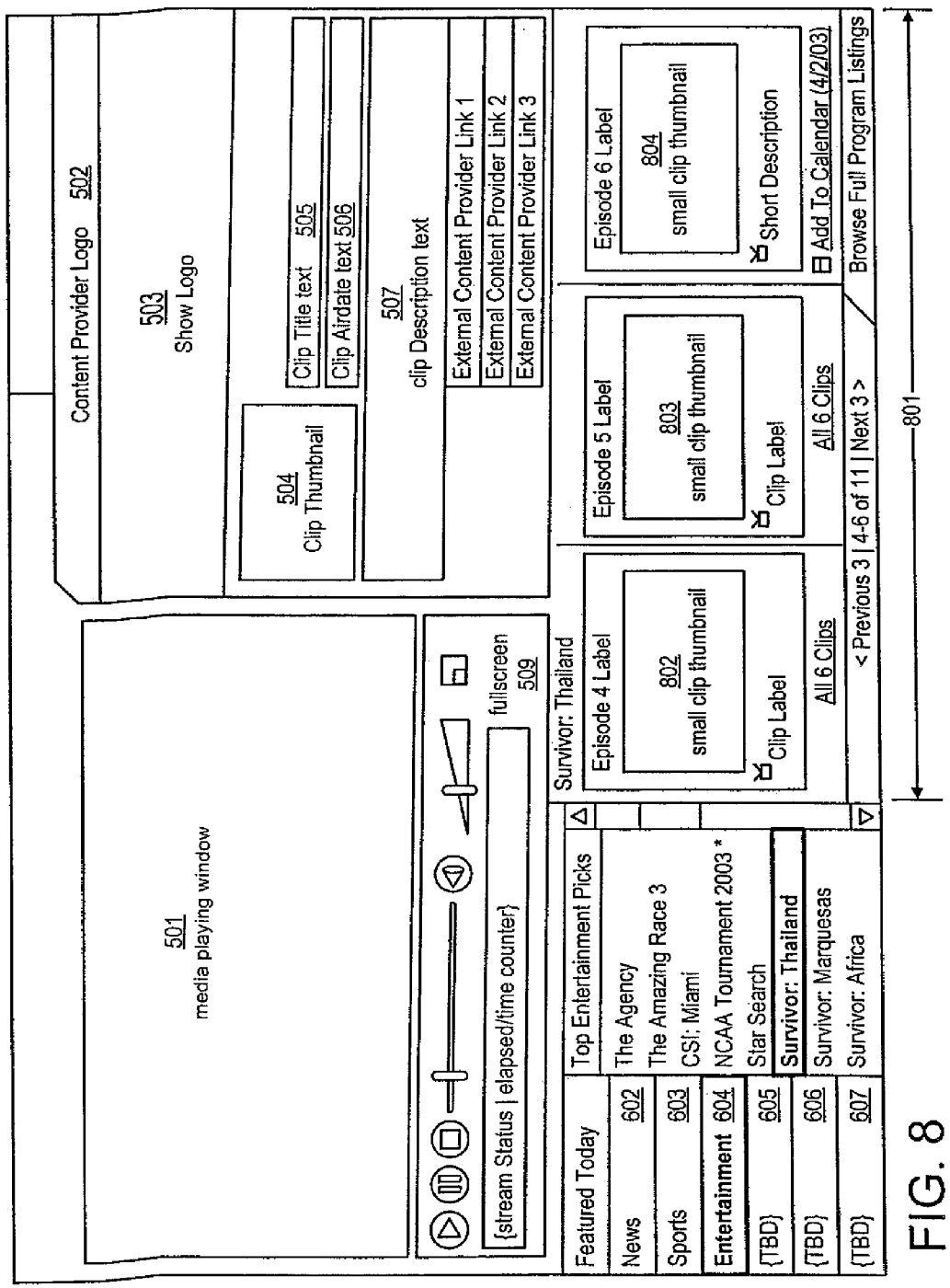
FIG. 8 illustrates a player of one embodiment of the present invention after an episode has been selected.

FIG. 8 illustrates the interface when a show has been selected in region 701. The title of the show is displayed in region 801 and thumbnails of available episodes are shown in regions 802-804. In one embodiment, region 801 is scrollable so that all available episodes can be accessed via that region. In addition, in certain embodiments, the thumbnails 802-804 have a pixel size of 88×66 dpi.

The present invention includes additional information in a local database in addition to the metadata provided by a content provider. This information can also be XML metadata or it can be associated attributes of the database in any suitable form. This data includes subscription information such as active/inactive, and level of subscription (e.g., regular, premium, package, etc.).

Figure 9:
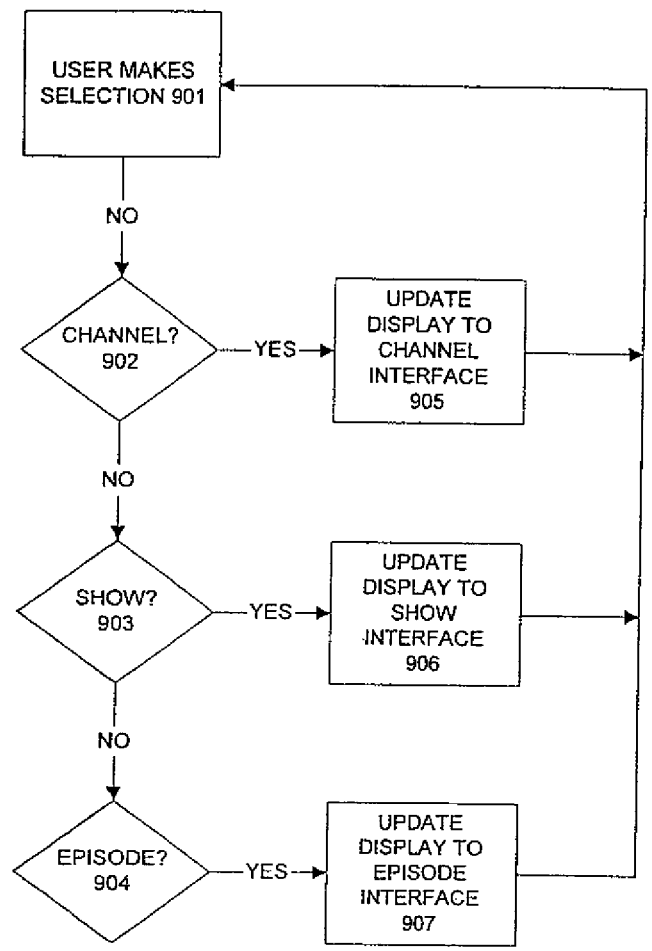
FIG. 9 is a flow diagram illustrating an embodiment of the operation of the present invention.

FIG. 9 is a flow diagram illustrating the operation of the present invention in one embodiment. At step 901, a user makes a selection and the system then goes through a number of decision blocks 902-904 to determine the appropriate display update to provide. At step 902, it is determined if the user has selected a channel. If so, the display is updated at stop 905 and provides a display such as shown in FIGS. 2 and 7.

At step 903, it is determined if the user has selected a show. If so, the display is updated at step 906 and provides a display on the site such as shown in FIG. 3 or on the player such as shown in FIG. 8. At step 904, it is determined if the user has selected an episode. If so, the site display is updated such as shown in FIG. 4 and the player is updated such as is shown in FIG. 8.

Figure 10:
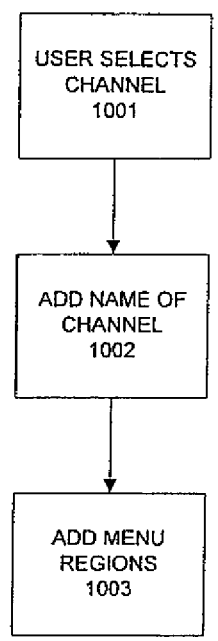
FIG. 10 is a flow diagram illustrating an embodiment of the invention.

FIG. 10 illustrates some of the operation of an embodiment of the invention when a channel is selected. At step 1001, the user has selected a channel. At step 1002, the system updates the display by placing the name of the selected channel in region 201 for the site. For the player, the display provides a pull down menu 701. At step 1003, a "Most Popular" display region 208 is provided at the site. For the player, the database is examined so that premium shows in the list can be identified by a marker, such as "star" 702.

In another embodiment of the invention, it is possible to create playlists related to user preferences. These lists can be either automatically generated based on content provider relationships, or editorially.

Content Invocation

Figure 12:
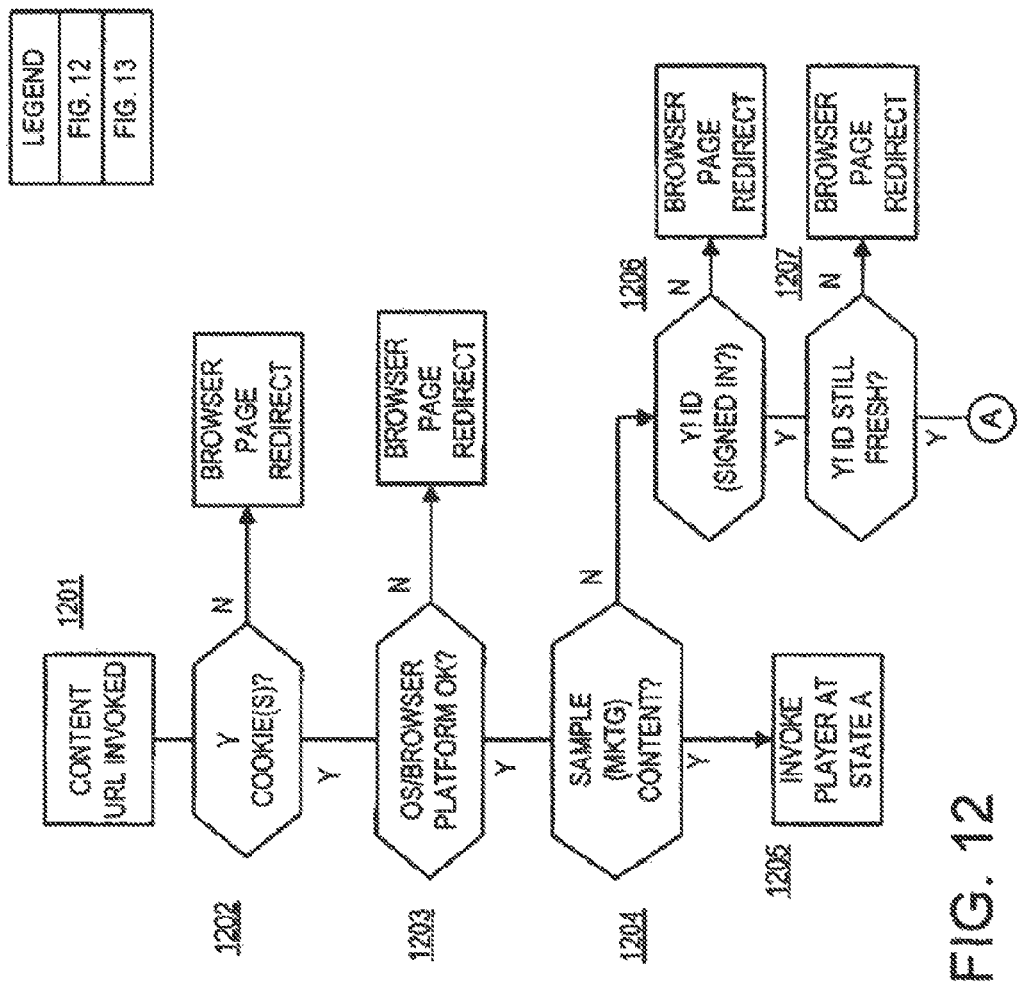
FIG. 12 is a flow diagram illustrating the content invocation flow of one embodiment of the present invention.
Figure 13:
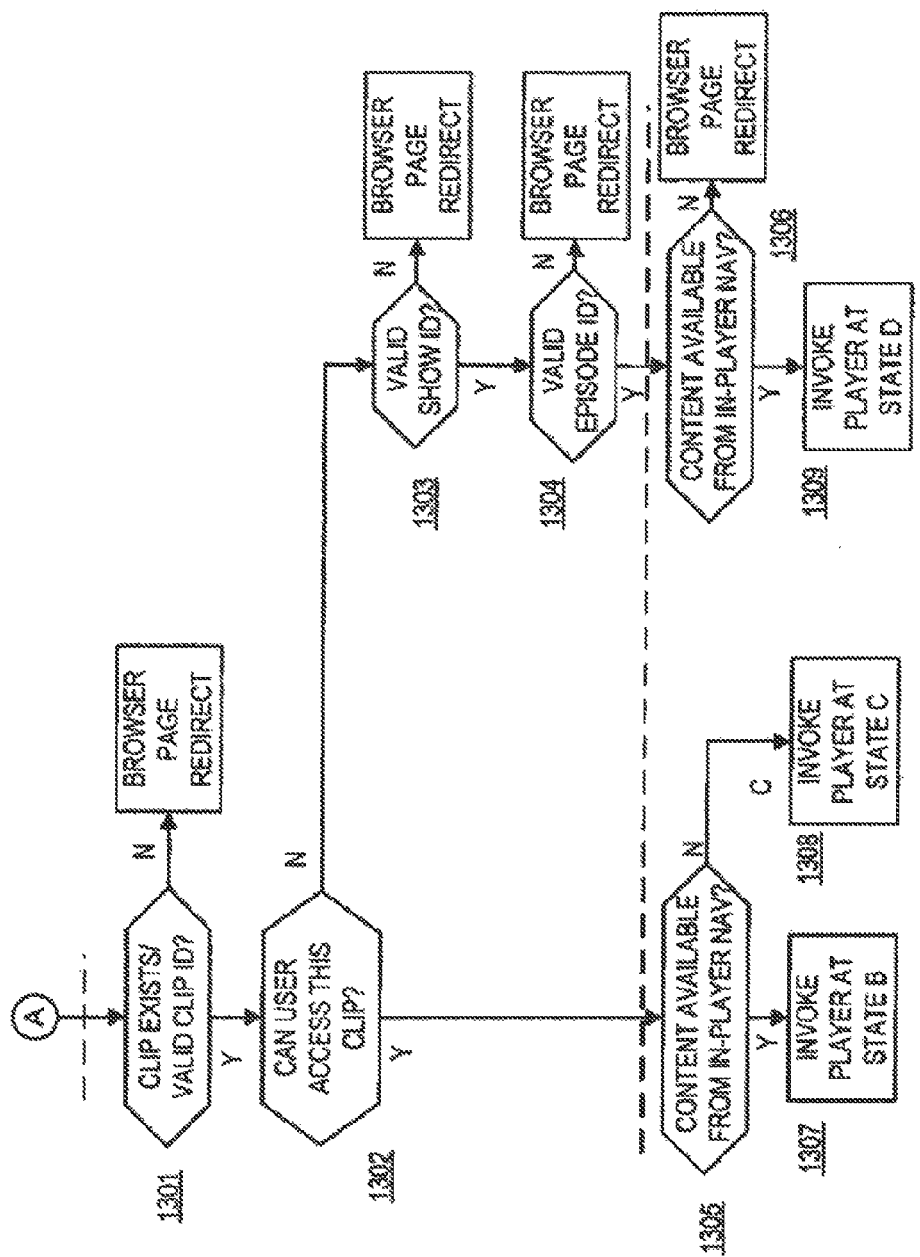
FIG. 13 is a continuation of the content invocation flow diagram FIG. 12.

FIGS. 12 and 13 illustrate the operation of content invocation in one embodiment of the invention. At step 1201 of FIG. 12, the user invokes a content uniform resource locator (URL) by clicking on a clip link from the browser, activating a bookmarked URL, redirecting from a 'short' URL, clicking within a Player/Viewer popup or by a variety of other means. One the content URL is invoked, at a logic gate (step 1202), it is determined whether the user's computer is configured to be able to accept cookies. An exemplary cookie may include a Yahoo media cookie. If it is determined that the user's computer is unable to accept cookies, the browser redirects to a standard error message, which may request that the user configure his computer to accept cookies.

If it is determined that the user's computer is able to accept cookies, at a logic gate (step 1203) it is determined whether the operating software (OS) and browser platforms on the user's computer are acceptable. For example, an acceptable OS platform could be Windows and an acceptable browser platform could be Internet Explorer 5.0 or higher. If it is determined that the platforms are not acceptable, the browser page redirects to a platform error message, which may inform the user that the platforms running on his computer are not compatible with the web site's platform(s). Otherwise, if it is determined that the platforms are acceptable, at a logic gate (step 1204) it is determined whether the user chooses to view sample marketing content. If it is determined that the user chooses to view sample marketing content, the process will proceed to step 1205 where the player will be invoked to operate at State A, which may be defined to play sample marketing content only.

However, if it is determined that the user does not choose to view sample marketing content, at a logic gate (step 1206) it is determined whether the user has signed into the web site. If it is determined that the user has not signed in, the browser page redirects to a sign-in error message, which may tell the user that he must sign into the web site to view the content. However, if it is determined that the user has signed in, at a logic gate (step 1207) it is determined whether the web page identification (I.D.) is still fresh. If it is determined that the I.D. is not fresh, the browser page redirects to an expiration error message, which may advise the user that the session has expired and request the user to sign in again.

Otherwise, if the I.D. is determined to be fresh, at a logic gate (step 1301, FIG. 13), it is determined whether there is an existing clip that corresponds to the requested clip I.D. number. If it is determined that the clip I.D. does not have a corresponding existing clip, the browser redirects to a clip error message, which may advise the user that there is no existing clip that matches his requested clip I.D. number. Otherwise, if it is determined that the requested clip I.D. has a clip available, at a logic gate (step 1302) it is determined whether the user, according to his subscription level, has the ability to access this particular clip.

If it is determined that the user does not have access to the clip, at a logic gate (step 1303), it is determined whether the clip's show has a valid I.D. number. If it is determined that the show I.D. number is not valid, the browser redirects to a show error message, which may advise the user that there is no existing show that corresponds to his requested show I.D. number. However, if it is determined that the show I.D. number is valid, at a logic gate (step 1304), it is determined whether the clip's episode has a valid I.D. number.

If it is determined that the episode I.D. number is not valid, the browser redirects to an episode error message, which may advise the user that there is no existing episode that corresponds to his requested episode I.D. number. Otherwise, if it is determined that the episode I.D. number is valid, at a logic gate (step 1306) it is determined whether the user, according to his subscription level, has access to view special promotional content. If it is determined that the user does not have access to view special promotional content, the browser redirects to a content error message, which may notify the user that the clip is not available because of the user's current subscription level and advise the user that the clip will be available to him if he subscribes to a higher subscription level. If it is determined that the user is able to view the special promotional content, the process will proceed to step 1309 where the player will be invoked to operate at State D. State D may be defined to be a particular content mode. In certain embodiments, for example, State D may be for a show without an available Clip or Promo. In this state the player displays the selected show and the remainder of the player shows special promos.

At the previously discussed logic gate located at step 1302, if it is determined that the user does have access to the clip, at a logic gate (step 1305), it is determined whether the user, according to his subscription level, has access to view special promotional content. If it is determined that the user does not have access to view special promotional content, the process will proceed to step 1308 where the player will be invoked to operate at State C. Otherwise, if it is determined that the user does have access to view special promotional content, the process will proceed to step 1307 where the player will be invoked to operate at State B. States B and C may be defined to be specific content modes. In certain embodiments, for example, State C may be an 'Archival' Episode/list-of-clips view. In this state the selected clip thumb is paged into view and hilited as 'current'. There is inactive breadcrumb text, no sticky channel hilite, and a/v+meta content plays/displays. State B may be a standard Episode/list-of-clips view. In this state the selected clip thumb is paged into view and hilited as 'current'. There is active breadcrumb text, channel btn hilites, and a/v+meta content plays/displays.

Figure 14:
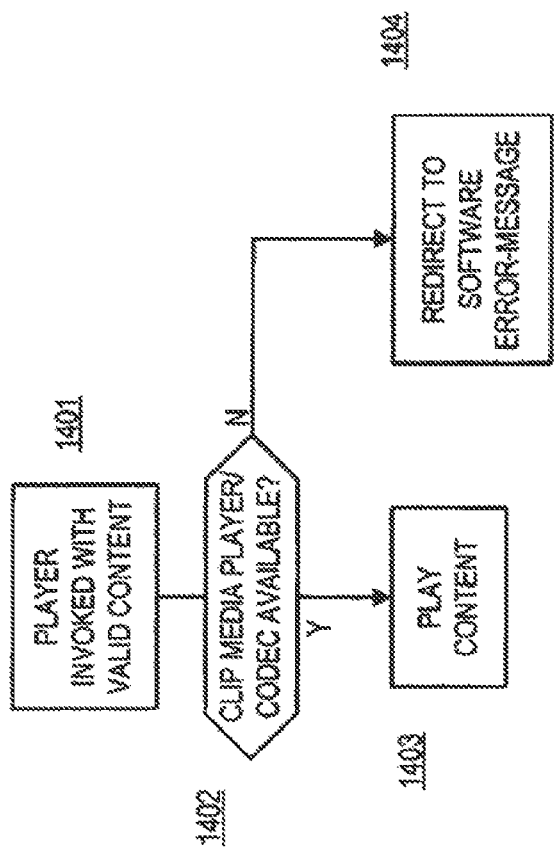
FIG. 14 is a flow diagram illustrating the confirmation of media playback capability.

After successful content invocation, the embodiment may undergo a logic sequence to confirm media playback capability. One possible logic process is depicted in FIG. 14. Once content has been invoked (step 1401), at a logic gate (step 1402), it is determined whether the user's computer has the necessary clip media player code. This decision is made by determining if the user's computer has specific software installed, e.g., Real or WinMP. If it is determined that the necessary software has not been installed onto the user's computer, the browser redirects to a software error message, which may advise the user that he will need to install specific software onto his computer in order to view the content. In certain embodiments, software error message may include browser window links to a media helper popup, and corresponding help pages. Otherwise, if it is determined that the necessary software has been installed onto the user's computer, the process proceeds to step 1403 where the audio/video content will be played normally.

Web Page Site Map

Figure 15:
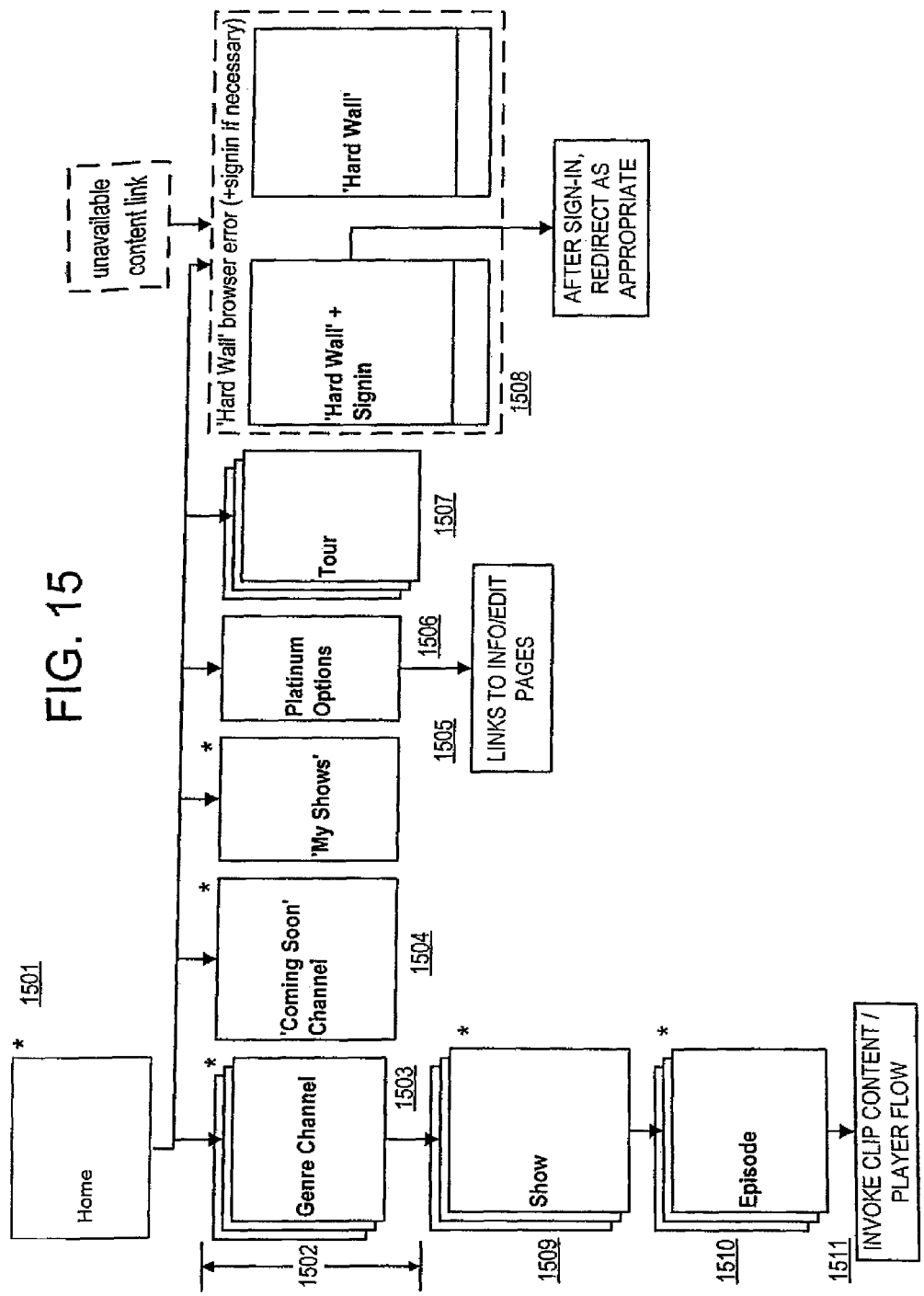
FIG. 15 is a flow diagram illustrating site-map hierarchy of one embodiment of the present invention.

An embodiment of the present invention can be represented by a web page hierarchy site map. FIG. 15 depicts one possible site map hierarchy for a content invocation structure.

FIG. 15 illustrates the path of web pages that a user navigates through in order to invoke audio/video clip content. Page 1501 represents the web site home page, which allows the user to make a number of various choices. Exemplary choices may include Featured content, shows and nav links. The pages on level 1502 illustrate the different options that the user can choose from. Some of the choices presented in this embodiment are type of genre (page 1503), which includes a list of shows for a channel, "coming soon" listings (page 1504), which includes a list of upcoming show/Episodes, "my shows" channel (page 1505), which includes a list of shows (shortcuts), an account summary (page 1506), which includes preferences, and account summary and in some embodiments, links to information/edit pages for alternative services, and a demonstration of web site features tour (Page 1507), which includes a demo of features and services. Page 1508, which is also located on level 1502, is triggered if the user has not signed in properly or does not have an existing account. If page 1508 is triggered, the browser redirects to a sign-in error message, which will advise the user that he will need to either attempt to sign in again or subscribe to the web site in order to view the content. If there was a sign in error, page 1508 displays a login module. After a successful sign in, the user is redirected as appropriate based on tracked src info. The default location would be the Home page. If there is an src page id, the browser is redirected to the src page id.

If the user selects a type of genre in page 1503, the web site will transfer the user to a lower level on the site map (page 1509). At page 1509, the user is presented with a listing of available shows to choose from. The displayed promo/editorial information should not conflict with the show on the particular page. Once the user selects a show to watch, the web site will transfer the user to a lower level on the site map (page 1510), which lists the available episodes for that particular show. After a user selects an episode from the listing on page 1510, the process will proceed to step 1511 where the player will be invoked to operate. It should also be appreciated that content can be invoked from different web pages as opposed to having to access numerous web pages before actually invoking content. In this particular embodiment those web pages which can invoke content are designated with an asterisk. It should also be appreciated that in various embodiments there can be other webpages that list prevalent information. For example one web page might list help topics that the user can access or legal information such as privacy information. These informative web pages can preferably be accessed from any of the above listed web pages.

Embodiment of a Computer Execution Environment

Figure 11:
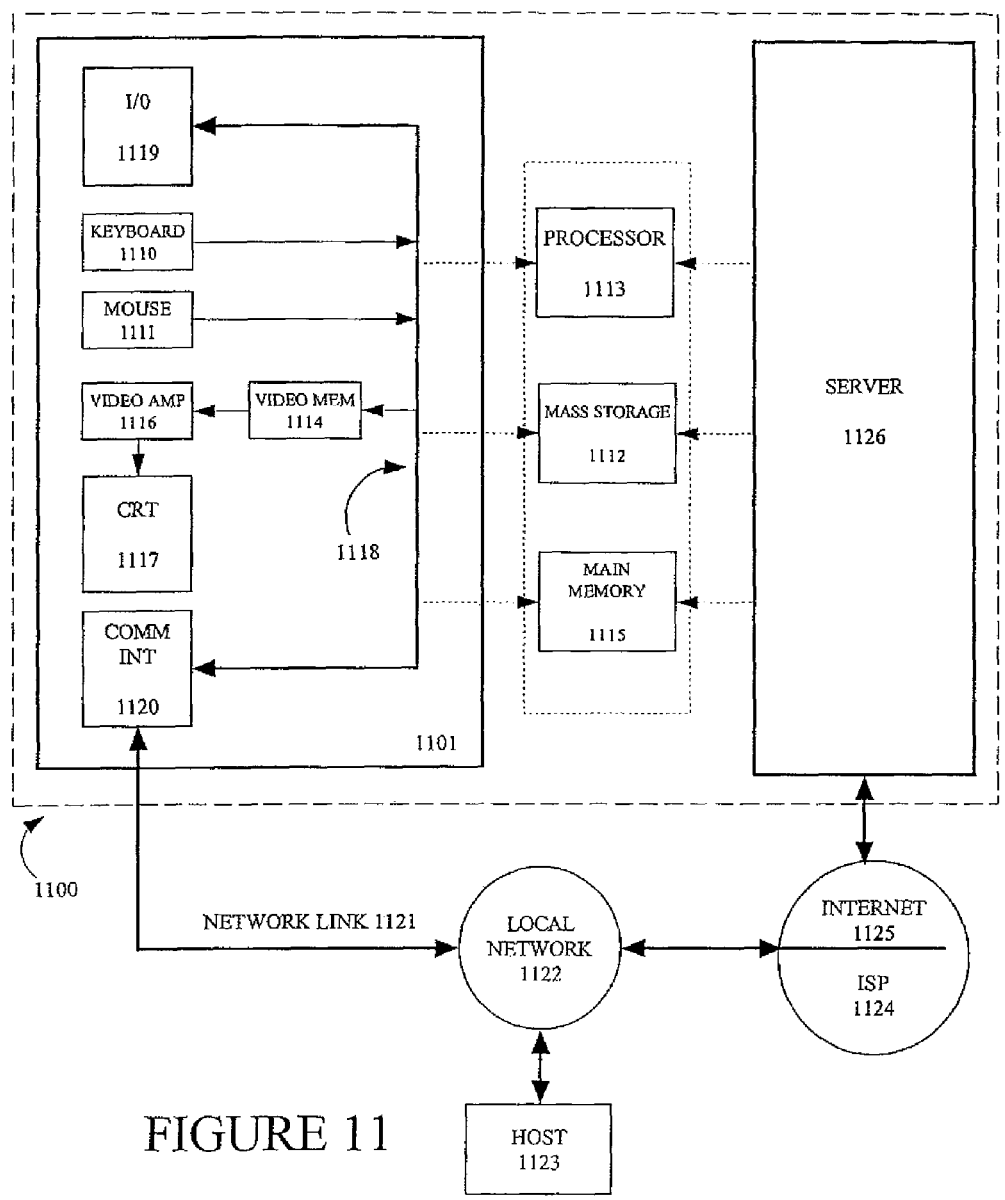
FIG. 11 is a flow diagram illustrating one embodiment of the present invention being implemented as computer software in the form of computer readable code.

An embodiment of the invention can be implemented as computer software in the form of computer readable code executed in a desktop general purpose computing environment such as environment 1100 illustrated in FIG. 11, or in the form of bytecode class files running in such an environment. A keyboard 1110 and mouse 1111 are coupled to a bi-directional system bus 1118. The keyboard and mouse are for introducing user input to a computer 1101 and communicating that user input to processor 1113.

Computer 1101 may also include a communication interface 1120 coupled to bus 1118. Communication interface 1120 provides a two-way data communication coupling via a network link 1121 to a local network 1122. For example, if communication interface 1120 is a modem, communication interface 1120 provides a data communication connection to the corresponding type of telephone line, which comprises part of network link 1121. If communication interface 1120 is a local area network (LAN) card, communication interface 1120 provides a data communication connection via network link 1121 to a compatible LAN. Wireless links are also possible. In any such implementation, communication interface 1120 sends and receives electrical, electromagnetic or optical signals, which carry digital data streams representing various types of information.

Network link 1121 typically provides data communication through one or ore networks to other data devices. For example, network link 1121 may provide a connection through local network 1122 to local server computer 1123 or to data equipment operated by ISP 1124. ISP 1124, in turn, provides data communication services through the worldwide packet data communication network now commonly referred to as the "Internet" 1125. Local network 1122 and Internet 1125 both use electrical, electromagnetic or optical signals, which carry digital data streams. The signals through the various networks and the signals on network link 1121 and through communication interface 1120, which carry the digital data to and from computer 1100, are exemplary forms of carrier waves transporting the information.

Processor 1113 may reside wholly on client computer 1101 or wholly on server 1026 or processor 1113 may have its computational power distributed between computer 1001 and server 1126. In the case where processor 1113 resides wholly on server 1126, the results of the computations performed by processor 1113 are transmitted to computer 1101 via Internet 1125, Internet Service Provider (ISP) 1124, local network 1122 and communication interface 1120. In this way, computer 1101 is able to display the results of the computation to a user in the form of output. Other suitable input devices may be used in addition to, or in place of, the mouse 1111 and keyboard 1110. I/O (input/output) unit 1119 coupled to bi-directional system bus 1118 represents such I/O elements as a printer, A/V (audio/video) I/O, etc.

Computer 1101 includes a video memory 1114, main memory 1115 and mass storage 1112, all coupled to bi-directional system bus 1118 along with keyboard 1110, mouse 1111 and processor 1113.

As with processor 1113, in various computing environments, main memory 1115 and mass storage 1112, can reside wholly on server 1126 or computer 1101, or they may be distributed between the two. Examples of systems where processor 1113, main memory 1115, and mass storage 1112 are distributed between computer 1101 and server 1126 include the thin-client computing architecture developed by Sun Microsystems, Inc., the palm pilot computing device, Internet ready cellular phones, and other Internet computing devices.

The mass storage 1112 may include both fixed and removable media, such as magnetic, optical or magnetic optical storage systems or any other available mass storage technology. Bus 1118 may contain, for example, 32 address lines for addressing video memory 1114 or main memory 1115. The system bus 1118 also includes, for example, a 32-bit data bus for transferring data between and among the components, such as processor 1113, main memory 1115, video memory 1114, and mass storage 1112. Alternatively, multiplex data/address lines may be used instead of separate data and address lines.

In one embodiment of the invention, the processor 1113 is a microprocessor manufactured by Motorola, such as the 680x0 processor or a microprocessor manufactured by Intel, such as the 80x86 or Pentium processor, or a SPARC microprocessor from Sun Microsystems, Inc. However, any other suitable microprocessor or microcomputer may be utilized. Main memory 1115 is comprised of dynamic random access memory (DRAM). Video memory 1114 is a dual-ported video random access memory. One port of the video memory 1114 is coupled to video amplifier 1116. The video amplifier 1116 is used to drive the cathode ray tube (CRT) raster monitor 1117. Video amplifier 1116 is well known in the art and may be implemented by any suitable apparatus. This circuitry converts pixel data stored in video memory 1114 to a raster signal suitable for use by monitor 1117. Monitor 1117 is a type of monitor suitable for displaying graphic images.

Computer 1101 can send messages and receive data, including program code, through the network(s), network link 1121 and communication interface 1120. In the Internet example, remote server computer 1126 might transmit a requested code for an application program through Internet 1125, ISP 1124, local network 1122 and communication interface 1120. The received code may be executed by processor 1113 as it is received, and/or stored in mass storage 1112, or other non-volatile storage for later execution. In this manner, computer 1100 may obtain application code in the form of a carrier wave. Alternatively, remote server computer 1126 may execute applications using processor 1113, and utilize mass storage 1112, and/or video memory 1115. The results of the execution at server 1126 are then transmitted through Internet 1125, ISP 1124, local network 1122, and communication interface 1120. In this example, computer 1101 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus an environment for display of content has been described.

I claim:

1. A method comprising:
providing, by at least one server computer, content management access to a plurality of content providers to access a data store resident on a web site and use a same data store template comprising one set of metadata elements to transfer media files' associated metadata to the web site's data store;
receiving, by the at least one server computer, from each of the plurality of content providers at least one media file via the content provider's content management access, each received media file comprising content;
for each media file received from a content provider of the plurality, receiving, by the at least one server computer from the content provider via the content provider's content management access, a transfer of the media file's associated metadata from the content provider to the web site's data store using the template, the metadata received from the content provider is organized according to the template, the template identifying metadata elements of the set and a correspondence between the metadata and the metadata elements;
mapping, by the at least one server computer, a number of the metadata elements to a plurality of metadata display areas of a content presentation user interface, the metadata display area for each mapped metadata element is consistent across the plurality of content providers such that a mapped metadata element's metadata display area displays the metadata element's corresponding metadata regardless of the content provider that provided the metadata, the content presentation user interface further comprising at least one content presentation area for presentation of the content received from the plurality of content providers; and
making, by the at least one server computer, the content presentation user interface available, the content presentation user interface providing a consistent interface for presentation of the content and metadata received from the plurality of content providers.

2. The method of claim 1, the content presentation user interface comprising at least one web page.

3. The method of claim 1, the content presentation user interface comprising a media player user interface.

4. The method of claim 1, the method further comprising:
receiving, by the at last one server computer, a metadata update from a content provider via the content provider's content management access.

5. The method of claim 4, the metadata update comprising an expiration date for a media file's content, the metadata update effectively removing the media file's content from access via the content presentation user interface in accordance with the expiration date.

6. The method of claim 1, the content presentation user interface comprising a channel description area comprising a plurality of user-selectable channels, a show description area comprising a description of a plurality of user-selectable shows, and an episode description area comprising a description of a plurality of user-selectable episodes.

7. The method of claim 6, at least one of the user-selectable channels corresponds to a genre.

8. The method of claim 1, the content comprising streaming media content, the streaming media content comprising at least one of audio streaming media content and video streaming media content.

9. The method of claim 8, the streaming media content comprising pre-recorded media.

10. The method of claim 8, the streaming media content comprising live broadcast media content.

11. The method of claim 1, a content's associated metadata elements comprising a title and a description for the content.

12. A system comprising:
at least one server computer configured to:
provide content management access to a plurality of content providers to access a data store resident on a web site and use a same data store template comprising one set of metadata elements to transfer media files' associated metadata to the web site's data store;
receive from each of the plurality of content providers at least one media file via the content provider's content management access, each received media file comprising content;
for each media file received from a content provider of the plurality, receive, from the content provider via the content provider's content management access, a transfer of the media file's associated metadata from the content provider to the web site's data store using the template, the metadata received from the content provider is organized according to the template, the template identifying metadata elements of the set and a correspondence between the metadata and the metadata elements;
map a number of the metadata elements to a plurality of metadata display areas of a content presentation user interface, the metadata display area for each mapped metadata element is consistent across the plurality of content providers such that a mapped metadata element's metadata display area displays the metadata element's corresponding metadata regardless of the content provider that provided the metadata, the content presentation user interface further comprising at least one content presentation area for presentation of the content received from the plurality of content providers; and
make the content presentation user interface available, the content presentation user interface providing a consistent interface for presentation of the content and metadata received from the plurality of content providers.

13. The system of claim 12, the content presentation user interface comprising at least one web page.

14. The system of claim 12, the content presentation user interface comprising a media player user interface.

15. The system of claim 12, the at least one server computer further configured to:
receive a metadata update from a content provider via the content provider's content management access.

16. The system of claim 15, the metadata update comprising an expiration date for a media file's content, the metadata update effectively removing the media file's content from access via the content presentation user interface in accordance with the expiration date.

17. The system of claim 12, the content presentation user interface comprising a channel description area comprising a plurality of user-selectable channels, a show description area comprising a description of a plurality of user-selectable shows, and an episode description area comprising a description of a plurality of user-selectable episodes.

18. The system of claim 17, at least one of the user-selectable channels corresponds to a genre.

19. The system of claim 12, the content comprising streaming media content, the streaming media content comprising at least one of audio streaming media content and video streaming media content.

20. The system of claim 19, the streaming media content comprising pre-recorded media.

21. The system of claim 19, the streaming media content comprising live broadcast media content.

22. The system of claim 12, a content's associated metadata elements comprising a title and a description for the content.

23. A computer-readable non-transitory storage medium for tangibly storing thereon computer-readable instructions that when executed cause at least one server computer to:
provide content management access to a plurality of content providers to access a data store resident on a web site and use a same data store template comprising one set of metadata elements to transfer media files' associated metadata to the web site's data store;
receive from each of the plurality of content providers at least one media file via the content provider's content management access, each received media file comprising content;
for each media file received from a content provider of the plurality, receive, from the content provider via the content provider's content management access, a transfer of the media file's associated metadata from the content provider to the web site's data store using the template, the metadata received from the content provider is organized according to the template, the template identifying metadata elements of the set and a correspondence between the metadata and the metadata elements;
map a number of the metadata elements to a plurality of metadata display areas of a content presentation user interface, metadata display area for each mapped metadata element is consistent across the plurality of content providers such that a mapped metadata element's metadata display area displays the metadata element's corresponding metadata regardless of the content provider that provided the metadata, the content presentation user interface further comprising at least one content presentation area for presentation of the content received from the plurality of content providers; and
make the content presentation user interface available, the content presentation user interface providing a consistent interface for presentation of the content and metadata received from the plurality of content providers.

24. The medium of claim 23, the content presentation user interface comprising at least one web page.

25. The medium of claim 23, the content presentation user interface comprising a media player user interface.

26. The medium of claim 23, the at least one server computer further configured to:
receive a metadata update from a content provider via the content provider's content management access.

27. The medium of claim 26, the metadata update comprising an expiration date for a media file's content, the metadata update effectively removing the media file's content from access via the content presentation user interface in accordance with the expiration date.

28. The medium of claim 23, the content presentation user interface comprising a channel description area comprising a plurality of user-selectable channels, a show description area comprising a description of a plurality of user-selectable shows, and an episode description area comprising a description of a plurality of user-selectable episodes.

29. The medium of claim 28, at least one of the user-selectable channels corresponds to a genre.

30. The medium of claim 23, the content comprising streaming media content, the streaming media content comprising at least one of audio streaming media content and video streaming media content.

31. The medium of claim 30, the streaming media content comprising pre-recorded media.

32. The medium of claim 30, the streaming media content comprising live broadcast media content.

33. The medium of claim 23, a content's associated metadata elements comprising a title and a description for the content.

* * * * *